(12) United States Patent
Tiede

(10) Patent No.: US 6,736,474 B1
(45) Date of Patent: May 18, 2004

(54) CHARGE PUMP CIRCUIT

(76) Inventor: John W. Tiede, 1607 N. Weber St., Colorado Springs, CO (US) 80907

( * ) Notice: Subject to any disclaimer, the term of this patent is extended or adjusted under 35 U.S.C. 154(b) by 0 days.

(21) Appl. No.: 10/190,916

(22) Filed: Jul. 8, 2002

Related U.S. Application Data

(63) Continuation of application No. 10/022,033, filed on Dec. 12, 2001, now abandoned.

(51) Int. Cl.[7] .................................................. G05F 1/10
(52) U.S. Cl. ................................................... 327/536
(58) Field of Search ................................. 327/530, 534, 327/535, 536, 537

(56) References Cited

U.S. PATENT DOCUMENTS

| | | | | |
|---|---|---|---|---|
| 5,140,182 A | * | 8/1992 | Ichimura | 327/536 |
| 6,023,188 A | * | 2/2000 | Lee et al. | 327/536 |
| 6,175,264 B1 | * | 1/2001 | Jinbo | 327/536 |
| 6,177,828 B1 | | 1/2001 | Kang et al. | 327/536 |
| 6,255,896 B1 | * | 7/2001 | Li et al. | 327/536 |
| 6,268,762 B1 | | 7/2001 | Nguyen | 327/536 |
| 6,275,425 B1 | | 8/2001 | Eliason | 365/189.11 |
| 6,278,315 B1 | | 8/2001 | Kim | 327/536 |
| 6,278,317 B1 | | 8/2001 | Hsu et al. | 327/536 |
| 6,292,048 B1 | | 9/2001 | Li | 327/536 |
| 6,294,948 B1 | | 9/2001 | Blodgett | 327/536 |
| 6,294,950 B1 | | 9/2001 | Lee et al. | 327/539 |
| 6,300,820 B1 | | 10/2001 | Fotouhi et al. | 327/536 |
| 6,373,324 B2 | * | 4/2002 | Li et al. | 327/536 |

* cited by examiner

*Primary Examiner*—Jeffrey Zweizig
(74) *Attorney, Agent, or Firm*—Dale B. Halling

(57) ABSTRACT

A charge pump circuit includes a first capacitor having an input coupled to a first signal. A second capacitor has an input coupled to a second signal. A first diode has an anode coupled to an output of the first capacitor and a cathode coupled to an output of the second capacitor. A second diode has an anode coupled to the output of the second capacitor and a cathode coupled to the output of the first capacitor. A controllable switch has a control input coupled to the output of the second capacitor and couples the output of the first capacitor to an output of the charge pump circuit.

17 Claims, 3 Drawing Sheets

CHARGE PUMP CIRCUIT

RELATED APPLICATIONS

This patent application is a continuation of the patent application having Ser. No. 10/022,033 filed on Dec. 12, 2001, assigned to the same assignee as the present application and now abandoned.

FIELD OF THE INVENTION

The present invention relates generally to the field of electronic circuits and more particularly to a charge pump circuit.

BACKGROUND OF THE INVENTION

Charge pumps are used in electronic circuits to provide voltages other than those provided by the power supply. Commonly charge pumps circuits are used in memory devices such as dynamic random access memory (DRAM) devices or EEPROMs (Electronic Erasable Programmable Read Only Memories). EEPROMs require larger voltage swings to write or erase memory cells. Most charge pumps are not able to efficiently transfer all of the charge in one stage to another stage or an output. As a result, more charge pump stages are required to reach a certain voltage. The inefficient transfer of charge results in less output current for a given clock speed.

Thus there exists a need for a charge pump circuit that has a more efficient charge transfer.

SUMMARY OF THE INVENTION

A charge pump circuit that achieves these goals includes a first capacitor having an input coupled to a first signal. A second capacitor has an input coupled to a second signal. A first diode has an anode coupled to an output of the first capacitor and a cathode coupled to an output of the second capacitor. A second diode has an anode coupled to the output of the second capacitor and a cathode coupled to the output of the first capacitor. A controllable switch has a control input coupled to the output of the second capacitor and couples the output of the first capacitor to an output of the charge pump circuit. In one embodiment, the first and second diode are field effect transistors configured as diodes and the controllable switch is a field effect transistor. The invention has a transient voltage overshoot at the gate of the transistor that turns the transistor on hard, which results in efficient charge transfer out of the capacitor. The efficient transfer of charge allows the capacitor to be smaller than prior art devices.

DETAILED DESCRIPTION OF THE DRAWINGS

Figure 1:
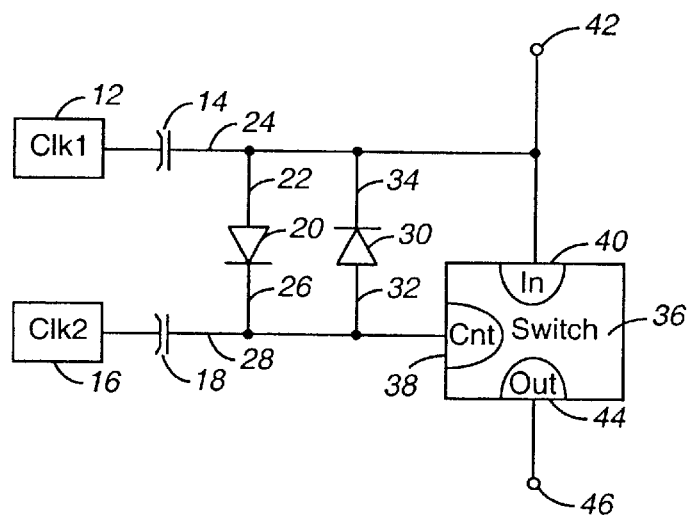
FIG. 1 is a block diagram of a charge pump circuit in accordance with one embodiment of the invention.

The charge pump of the present invention uses an efficient charge transfer mechanism to increase the performance of a charge pump circuit. FIG. 1 is a block diagram of a charge pump circuit 10 in accordance with one embodiment of the invention. The circuit 10 has a first clock 12 coupled to an input of a first capacitor (means for storing a first charge) 14. A second clock 16 is coupled to an input of a second capacitor 18. A first diode 20 has an anode 22 coupled to the output 24 of the first capacitor 14 and a cathode 26 coupled to the output 28 of the second capacitor, 18. A second diode 30 has an anode 32 coupled to the output 28 of the second capacitor 18 and a cathode 34 coupled to the output of the first capacitor 14. Note that the output of the capacitors is merely used to designate an electrical node and no electrical meaning should be inferred. A controllable switch 36 has a control input 38 coupled to the output 28 of second capacitor 18. The controllable switch 36 has an input 40 coupled to both the output 24 of the first capacitor 14 and the input 42 of the circuit 10 and an output 44 coupled to the output 46 of the circuit 10.

Figure 2:
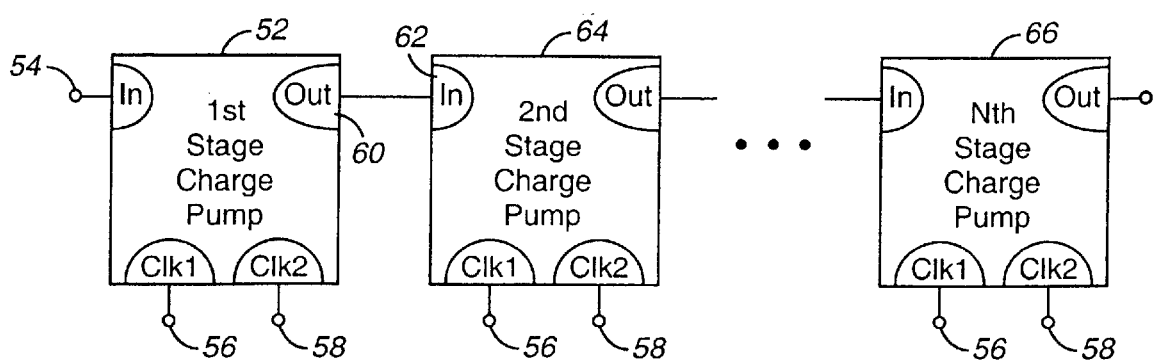
FIG. 2 is a block diagram of a multistage charge pump circuit in accordance with one embodiment of the invention.

FIG. 2 is a block diagram of a multistage charge pump circuit 50 in accordance with one embodiment of the invention. The multistage charge pump circuit 50 has a first stage charge pump 52 with a single switching transistor. The first stage charge pump 52 has an input 54, a first clock input 56 and a second clock input 58. An output 60 of the first stage 52 is coupled to an input 62 of a second stage charge pump 64. The second stage charge pump 64 also has a first clock 56 and a second clock input 58. In one embodiment, the circuit 50 includes a plurality of charge pump stages 66. Note that all the charge pump stages may be of the same design as shown herein or some of the charge pump stages could be of a more conventional design.

Figure 3:
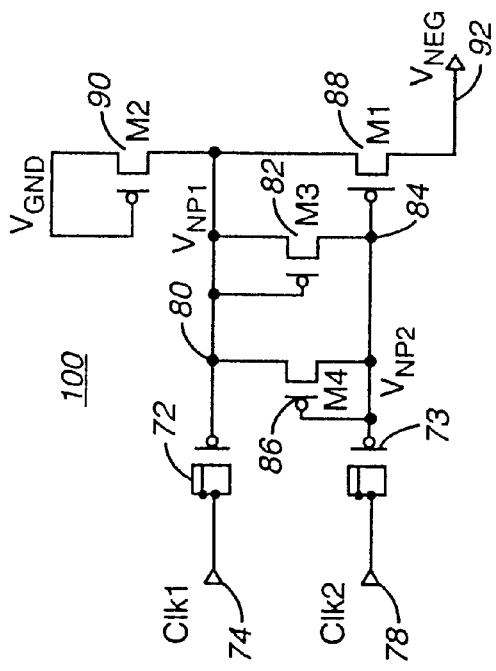
FIG. 3 is a circuit diagram of a positive charge pump circuit in accordance with one embodiment of the invention.

FIG. 3 is a circuit diagram of a positive charge pump circuit 70 in accordance with one embodiment of the invention. The circuit 70 has a first capacitor ($C_p$) 72 coupled to a first clock input 74. Note that the first capacitor 72 is a field effect transistor coupled as a capacitor. A second capacitor (C) 76 is coupled to a second clock input 78. The output 80 of the first capacitor 72 is coupled to a first isolated gate field effect transistor (FET) configured as a diode (M3) 82. The FET 82 has its gate and drain coupled to node 80. The source of FET 82 is coupled to an output 84 of the second capacitor 76. A second isolated gate FET (M4) 86 has its gate and source coupled to node 84 and its drain coupled to node 80. The single switching transistor (M1) 88 has its gate coupled to node 84. The source of transistor 88 is coupled to a drain of transistor (M2) 90. The gate and source of transistor 90 are coupled to a power supply voltage (Vpwr). The drain of the single switching transistor 88 is coupled to an output 92 of the charge pump circuit. Note that this charge pump circuit may be cascaded with a plurality of other charge pump circuits to create higher voltages. The transistor (M2) 90 is used to provide a starting voltage for the charge pump circuit 70 and may be replaced by other devices such as another charge pump stage.

Figure 5:
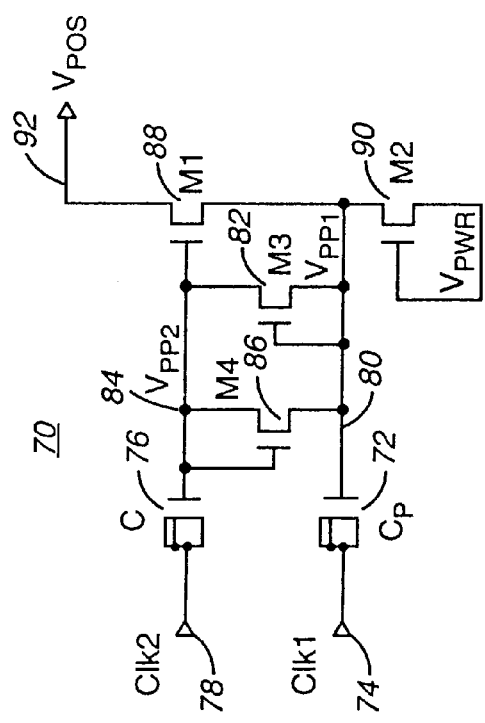
FIG. 5 is a circuit diagram of a negative charge pump circuit in accordance with one embodiment of the invention.
Figure 6:
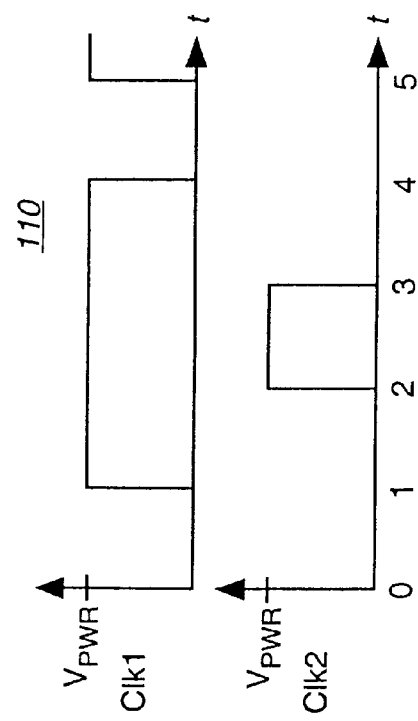
FIG. 6 is a clocking diagram for the negative charge pump circuit in accordance with one embodiment of the invention.

FIG. 5 is a circuit diagram of a negative charge pump circuit 100 in accordance with one embodiment of the invention. Note that the negative charge pump circuit is essentially the same as the positive charge pump circuit 70 (FIG. 3). As a result, the same reference numerals will be used for similar items. The differences between the circuits include that the switching transistor 88 and IGFETs 82, 86 are p-channel devices instead of n-channel devices. The transistor (M2) 90 in this case is coupled to ground (Vgnd)

and the capacitors 72 and 78 are made from p-channel transistors. The clocking schemes shown in FIGS. 4 & 6 are essentially inverses of each other.

Figure 4:
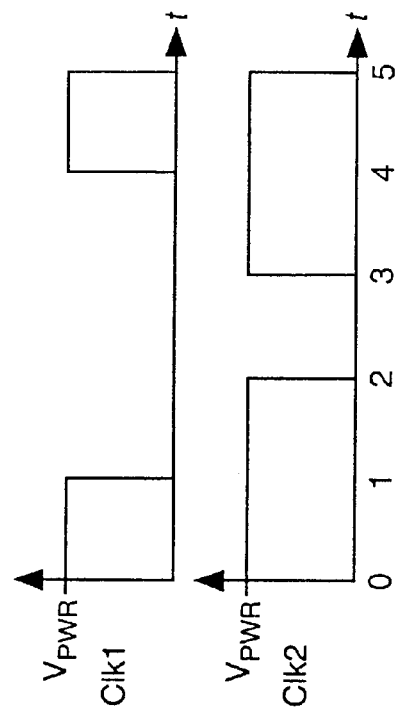
FIG. 4 is a clocking diagram for the positive charge pump circuit in accordance with one embodiment of the invention.

FIG. 4 is a clocking diagram 110 for the positive charge pump circuit in accordance with one embodiment of the invention. The operation of the circuit will be explained with respect to FIG. 4. The negative charge pump works essentially in the same manner and will not be described in detail. At time t=0 we will assume that the pump has been in operation for some time. At time t=0 node 80 is precharged to Vpwr−Vtn. Where, Vtn is the threshold voltage of transistor 90. Node 84 is charged to Vpos−Vtn'. Where, Vtn' is the threshold voltage of transistor 82 with back gate bias. We will assume that Vtn is approximately equal to Vtn'. At time t=1 the voltage of node 80 will be boosted to a voltage of approximately 2 Vpwr−Vtn. This assumes that capacitor 72 is sufficiently large with respect to the capacitance of node 80 to efficiently divide the input clock voltage at node 80. The voltage at node 84 becomes 2 Vpwr−2 Vtn. The gate to source voltage of transistor M1 82 will be Vtn. In one embodiment, we ensure that M1 is off by making the channel length of M1 longer than a minimum channel length while keeping transistor 82 at its minimum channel length. For deep sub-micron CMOS processes, short channel effects modulate the threshold voltages of the transistors. At time t=2 node 84 temporarily has a transient voltage overshoot to 3 Vpwr−2 Vtn. We again assume that capacitor 78 is sufficiently large with respect to the capacitance of node 84 to efficiently divide the input clock voltage at node 84. During this transient overshoot on node 84, transistor M1 88 will be turned on. Charge will be shared between node 80 and Vpos 92 until the voltage between these nodes is equalized. The transistor M4 is designed in one embodiment to be a narrow device to allow or increase the time of the transient voltage overshoot. The overshoot on node 84 ensures that transistor M1 88 is on hard and Vpos 92 and node 80 (Vpp1) quickly and completely equalize. Because the voltage of node 80 has gone down to equalize with Vpos 92, the voltage at node 84 will follow it down. Charge will be drained from node 84 through the diode configured transistor M4 86 to Vpos+Vpwr−Vtn.

At time t=3 clock 2 transitions from high to low. The voltage at node 84 will be Vpos−Vtn. Transistor M1 88 will be off because of its gate-to-source voltage is −Vtn. At time t=4 clock 1 transitions from high to low and node 80 overshoots from Vpos to Vpos−Vpwr. The voltage clamp transistor M2 90 quickly restores node 80 to Vpwr−Vtn. At time t=5 the process repeats itself. The voltage transient overshoot at time t=2 provides the efficient transfer of charge and thus allows the circuit to provide higher voltages per stage and more current. FIG. 6 is a clocking diagram for the negative charge pump circuit in accordance with one embodiment of the invention. The process works essentially the same for the negative charge pump circuit 100 of FIG. 5.

Figure 7:
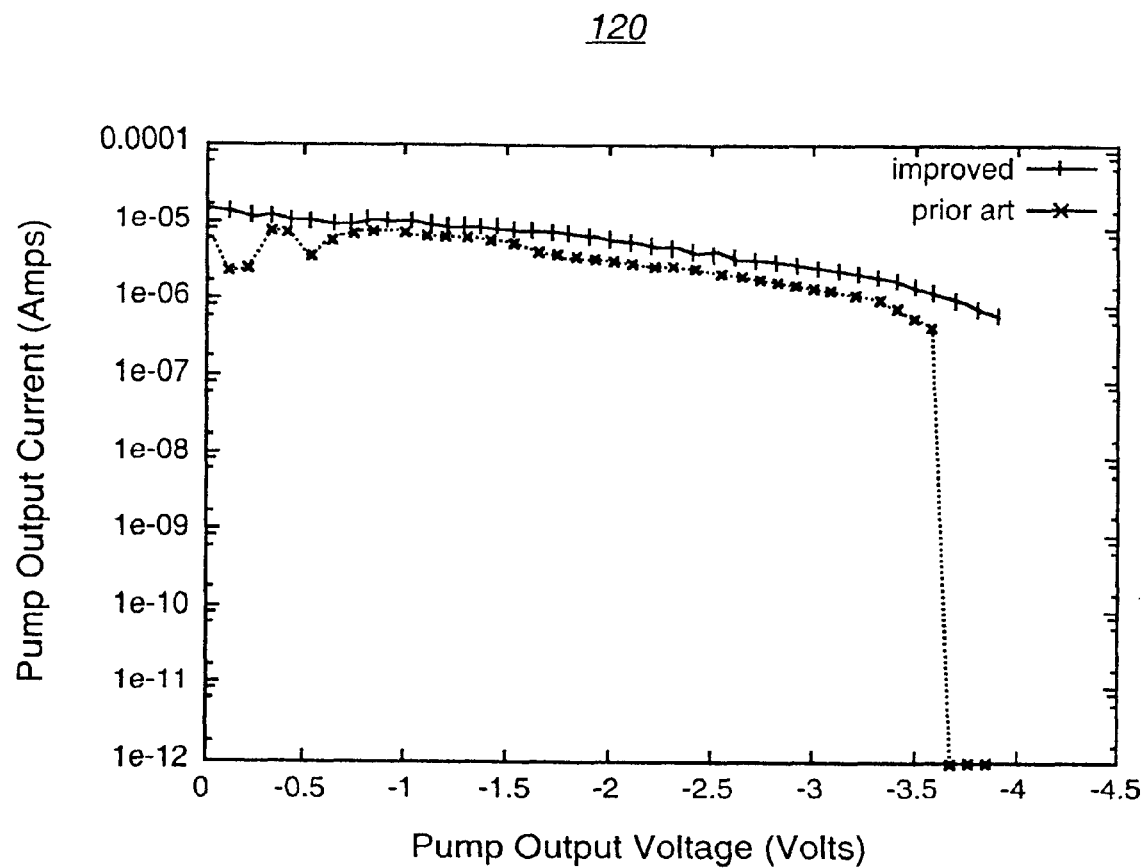
FIG. 7 is a simulation of the performance of a two stage negative charge pump for both the prior art and the present invention in accordance with one embodiment of the invention.

FIG. 7 is a simulation 120 of the performance of a two stage negative charge pump for both the prior art and the present invention in accordance with one embodiment of the invention. The prior art device is a well known charge pump circuit having two switching transistors, two capacitors and essentially the same clocking scheme shown in FIG. 6, for a schematic of single stage of the prior art device see FIG. 3 of U.S. Pat. No. 6,268,762. The chart shows the output current versus output voltage. As can be seen from the chart the invention has a higher current for all output voltages. In addition, the invention is able to support higher voltages. This allows the invention to use fewer stages to obtain a desired voltage.

Note that the invention uses bipolar diodes. In the one embodiment, the switch device would also be a bipolar device. If bipolar diodes are used then there is a restriction on the possible threshold voltage of the switch device across possible process, voltage and temperatures. The threshold voltage of the switch must be less than the built-in voltage of the diodes. If the diodes have a smaller built-in voltage than the threshold voltage of the switch, the switch may not turn off.

While the invention has been described in conjunction with specific embodiments thereof, it is evident that many alterations, modifications, and variations will be apparent to those skilled in the art in light of the foregoing description. For instance, the circuit may be made of discrete devices allowing the FET transistors to be replaced with TTL transistors. The diodes may be discrete devices. Accordingly, it is intended to embrace all such alterations, modifications, and variations in the appended claims.

What is claimed is:

1. A charge pump circuit, comprising:
    a first capacitor having an input coupled to a first signal;
    a second capacitor having an input coupled to a second signal, wherein the second capacitor is sufficiently large to efficiently divide the second signal voltage;
    a first diode having an anode coupled to an output of the first capacitor and a cathode coupled to an output of the second capacitor;
    a second diode having an anode coupled to the output of the second capacitor and a cathode coupled to the output of the first capacitor, wherein the second diode has a minimum channel length; and
    a controllable switch having a control input coupled to the output of the second capacitor and connecting the output of the first capacitor to an output of the charge pump circuit, wherein the controllable switch has a channel length greater than a minimum channel length.

2. The circuit of claim 1, wherein the controllable switch is a transistor.

3. The circuit of claim 1, wherein the output of the first capacitor is coupled to an input of the charge pump circuit.

4. The circuit of claim 1, wherein the first diode is an isolated gate field effect transistor configured as a diode.

5. The circuit of claim 1, wherein the second diode is an isolated gate field effect transistor configured as a diode.

6. The circuit of claim 2, wherein a gate voltage of the transistor has a transient voltage overshoot.

7. A charge pump circuit, comprising:
    a first charge pump stage having a single switching transistor coupled to a diode, wherein the single switch transistor has a channel length greater than a minimum channel length and the diode has the minimum channel length; and
    a second charge pump stage having an input coupled to an output of the first charge pump stage.

8. The charge pump circuit of claim 7, further including a plurality of charge pump stages coupled to the second charge pump stage.

9. The charge pump circuit of claim 7, wherein the first charge pump stage comprises:
    a first capacitor having an;input coupled to a first signal;
    a second capacitor having an input coupled to a second signal; and
    a first diode having an anode coupled to an output of the first capacitor and a cathode coupled to an output of the second capacitor.

10. The charge pump circuit of claim 9, wherein the first charge pump stage further includes:
   a second diode having an anode coupled to the output of the second capacitor and a cathode coupled to the output of the first capacitor; and
   the single switching transistor having a gate coupled to the output of the second capacitor and connecting the output of the first capacitor to an output of the charge pump circuit.

11. The charge pump circuit of claim 10, wherein a gate to source threshold voltage of the single switching transistor is greater than a threshold voltage of the second diode.

12. The charge pump circuit of claim 7, wherein the second charge pump stage has a single switching transistor.

13. A charge pump circuit, comprising:
   means for generating a first signal;
   means for storing a first charge coupled to the means for generating the first signal;
   means for generating a second signal;
   means for storing a second charge coupled to the means for generating the second signal;
   means for controlling a first current flow coupled between an output of the means for storing the first charge and an output of the means for storing the second charge;
   means for controlling a second current flow coupled between the output of the means for storing the first charge and the output of the means for storing the second charge, the means for controlling the second current flow having a current bias opposite of the means for controlling the first current flow, wherein the means for controlling a second current flow has a minimum channel length; and
   means for switching having a means for controlling the means for switching coupled to the output of the second means for storing the second charge, the means for switching coupling an input of the charge pump circuit to an output of the charge pump circuit, wherein the means for switching has a channel length longer than a minimum channel length.

14. The charge pump circuit of claim 13, wherein the means for storing the first charge is a capacitor.

15. The charge pump circuit of claim 13, wherein the means for controlling the first current flow is a diode.

16. The charge pump circuit of claim 13, wherein the means for switching is a transistor.

17. The charge pump circuit of claim 16, wherein a gate voltage of the transistor has a transient voltage overshoot.

* * * * *